US00RE43379E

(19) United States
(12) Reissued Patent
Suzuki et al.

(10) Patent Number: US RE43,379 E
(45) Date of Reissued Patent: May 15, 2012

(54) MUSIC SELECTING APPARATUS AND METHOD

(75) Inventors: Yasunori Suzuki, Tsurugashima (JP); Yasuteru Kodama, Tsurugashima (JP); Satoshi Odagawa, Tsurugashima (JP); Takehiko Shioda, Tsurugashima (JP); Shinichi Gayama, Tsurugashima (JP)

(73) Assignee: Pioneer Corporation, Tokyo (JP)

(21) Appl. No.: 12/392,579

(22) Filed: Feb. 25, 2009

Related U.S. Patent Documents

Reissue of:
(64) Patent No.: 7,385,130
Issued: Jun. 10, 2008
Appl. No.: 10/959,314
Filed: Oct. 7, 2004

(30) Foreign Application Priority Data

Oct. 9, 2003 (JP) ..... 2003-350728
Mar. 29, 2004 (JP) ..... 2004-095916

(51) Int. Cl.
*G10H 1/00* (2006.01)
(52) U.S. Cl. ..... 84/600; 84/613; 84/637
(58) Field of Classification Search ..... 84/600–602, 84/613, 637, 650, 669
See application file for complete search history.

(56) References Cited

U.S. PATENT DOCUMENTS 5,218,153 A * 6/1993 Minamitaka ..... 84/613
5,402,339 A 3/1995 Nakashim et al.
5,481,066 A * 1/1996 Kitamura ..... 84/637
5,510,572 A * 4/1996 Hayashi et al. ..... 84/609
5,852,252 A * 12/1998 Takano ..... 84/650
5,963,957 A 10/1999 Hoffberg
5,990,407 A * 11/1999 Gannon ..... 84/613
6,166,314 A * 12/2000 Weinstock et al. ..... 84/483.1
6,545,209 B1 4/2003 Flannery et al.
6,821,203 B2 * 11/2004 Suga et al. ..... 463/7
6,911,592 B1 * 6/2005 Futamase et al. ..... 84/622
6,987,221 B2 * 1/2006 Platt ..... 84/601
6,993,532 B1 * 1/2006 Platt et al. ..... 707/736
6,996,390 B2 * 2/2006 Herley et al. ..... 455/345
7,024,424 B1 * 4/2006 Platt et al. ..... 1/1

(Continued)

FOREIGN PATENT DOCUMENTS

JP 8-239171 A 9/1996

(Continued)

OTHER PUBLICATIONS

Shusaku Sawato, and other four, "Study on Extracting Music Characteristics with Genetic Algorithm for Intelligent Retrieval," Proceedings of the 1999 Information and Systems Society Conference of IEICE, the Institute of Electronics, Information and Communication Engineers, Aug. 16, 1999, p. 25.

(Continued)

*Primary Examiner* — David S. Warren
(74) *Attorney, Agent, or Firm* — Sughrue Mion, PLLC

(57) ABSTRACT

A music selecting apparatus and method, which are capable to indicate a music piece matching with the sensitivities of the user. A degree of chord change is stored as data for each of a plurality of music pieces, a sensitivity word for music selection is set in accordance with an input operation, and a music piece having the chord change degree corresponding to the set sensitivity word is detected in accordance with the chord change degree of each of the plurality of music pieces.

19 Claims, 10 Drawing Sheets

| SENSITIVITY WORD | DEGREE OF CHORD CHANGE (1) | DEGREE OF CHORD CHANGE (2) | DEGREE OF CHORD CHANGE (3) | BEAT | MAXIMUM BEAT LEVEL | AMPLITUDE LEVEL | MAXIMUM AMPLITUDE LEVEL | KEY |
|---|---|---|---|---|---|---|---|---|
| RHYTHMICAL | M' a1,S' a1 | M' b1,S' b1 | M' c1,S' c1 | M' d1,S' d1 | M' e1,S' e1 | M' f1,S' f1 | M' g1,S' g1 | M' h1,S' h1 |
| GENTLE | M' a2,S' a2 | M' b2,S' b2 | M' c2,S' c2 | M' d2,S' d2 | M' e2,S' e2 | M' f2,S' f2 | M' g2,S' g2 | M' h2,S' h2 |
| BRIGHT | M' a3,S' a3 | M' b3,S' b3 | M' c3,S' c3 | M' d3,S' d3 | M' e3,S' e3 | M' f3,S' f3 | M' g3,S' g3 | M' h3,S' h3 |
| SAD | M' a4,S' a4 | M' b4,S' b4 | M' c4,S' c4 | M' d4,S' d4 | M' e4,S' e4 | M' f4,S' f4 | M' g4,S' g4 | M' h4,S' h4 |
| HEALING | M' a5,S' a5 | M' b5,S' b5 | M' c5,S' c5 | M' d5,S' d5 | M' e5,S' e5 | M' f5,S' f5 | M' g5,S' g5 | M' h5,S' h5 |
| LONELY | M' a6,S' a6 | M' b6,S' b6 | M' c6,S' c6 | M' d6,S' d6 | M' e6,S' e6 | M' f6,S' f6 | M' g6,S' g6 | M' h6,S' h6 |

U.S. PATENT DOCUMENTS

| | | | | |
|---|---|---|---|---|
| 7,196,258 | B2 * | 3/2007 | Platt | 84/600 |
| 7,247,786 | B2 * | 7/2007 | Suzuki et al. | 84/615 |
| 7,385,130 | B2 * | 6/2008 | Suzuki et al. | 84/600 |
| 2002/0004420 | A1 * | 1/2002 | Suga et al. | 463/7 |
| 2003/0045953 | A1 | 3/2003 | Weare | |
| 2003/0221541 | A1 * | 12/2003 | Platt | 84/609 |
| 2004/0002310 | A1 * | 1/2004 | Herley et al. | 455/179.1 |
| 2004/0007120 | A1 * | 1/2004 | Futamase et al. | 84/622 |
| 2004/0237759 | A1 * | 12/2004 | Bill | 84/668 |
| 2004/0243592 | A1 * | 12/2004 | Bill | 707/100 |
| 2005/0103189 | A1 * | 5/2005 | Suzuki et al. | 84/613 |
| 2005/0262528 | A1 * | 11/2005 | Herley et al. | 725/19 |
| 2006/0032363 | A1 * | 2/2006 | Platt | 84/601 |
| 2006/0064037 | A1 * | 3/2006 | Shalon et al. | 600/586 |
| 2009/0088877 | A1 * | 4/2009 | Terauchi et al. | 700/94 |
| 2009/0249945 | A1 * | 10/2009 | Yamashita et al. | 84/612 |

FOREIGN PATENT DOCUMENTS

| | | | |
|---|---|---|---|
| JP | 10-134549 | A | 5/1998 |
| JP | 2000-57177 | A | 2/2000 |
| JP | 2001-306580 | A | 11/2001 |
| JP | 2003-132085 | A | 5/2003 |

OTHER PUBLICATIONS

Hiroshi Shibata, and another one, "Learning meta-information of contents by agents and its evaluation," Proceedings of the 2003 Communications Society Conference 2, the Institute of Electronics, Information and Communication Engineers, Sep. 10, 2003, pp. 17 and 18.

* cited by examiner

FIG. 2

| SENSITIVITY WORD | DEGREE OF CHORD CHANGE (1) | DEGREE OF CHORD CHANGE (2) | DEGREE OF CHORD CHANGE (3) | BEAT | MAXIMUM BEAT LEVEL | AMPLITUDE LEVEL | MAXIMUM AMPLITUDE LEVEL | KEY |
|---|---|---|---|---|---|---|---|---|
| RHYTHMICAL | Ma1, Sa1 | Mb1, Sb1 | Mc1, Sc1 | Md1, Sd1 | Me1, Se1 | Mf1, Sf1 | Mg1, Sg1 | Mh1, Sh1 |
| GENTLE | Ma2, Sa2 | Mb2, Sb2 | Mc2, Sc2 | Md2, Sd2 | Me2, Se2 | Mf2, Sf2 | Mg2, Sg2 | Mh2, Sh2 |
| BRIGHT | Ma3, Sa3 | Mb3, Sb3 | Mc3, Sc3 | Md3, Sd3 | Me3, Se3 | Mf3, Sf3 | Mg3, Sg3 | Mh3, Sh3 |
| SAD | Ma4, Sa4 | Mb4, Sb4 | Mc4, Sc4 | Md4, Sd4 | Me4, Se4 | Mf4, Sf4 | Mg4, Sg4 | Mh4, Sh4 |
| HEALING | Ma5, Sa5 | Mb5, Sb5 | Mc5, Sc5 | Md5, Sd5 | Me5, Se5 | Mf5, Sf5 | Mg5, Sg5 | Mh5, Sh5 |
| LONELY | Ma6, Sa6 | Mb6, Sb6 | Mc6, Sc6 | Md6, Sd6 | Me6, Se6 | Mf6, Sf6 | Mg6, Sg6 | Mh6, Sh6 |

FIG. 9

| SENSITIVITY WORD | DEGREE OF CHORD CHANGE (1) | DEGREE OF CHORD CHANGE (2) | DEGREE OF CHORD CHANGE (3) | BEAT | MAXIMUM BEAT LEVEL | AMPLITUDE LEVEL | MAXIMUM AMPLITUDE LEVEL | KEY |
|---|---|---|---|---|---|---|---|---|
| RHYTHMICAL | M' a1,S' a1 | M' b1,S' b1 | M' c1,S' c1 | M' d1,S' d1 | M' e1,S' e1 | M' f1,S' f1 | M' g1,S' g1 | M' h1,S' h1 |
| GENTLE | M' a2,S' a2 | M' b2,S' b2 | M' c2,S' c2 | M' d2,S' d2 | M' e2,S' e2 | M' f2,S' f2 | M' g2,S' g2 | M' h2,S' h2 |
| BRIGHT | M' a3,S' a3 | M' b3,S' b3 | M' c3,S' c3 | M' d3,S' d3 | M' e3,S' e3 | M' f3,S' f3 | M' g3,S' g3 | M' h3,S' h3 |
| SAD | M' a4,S' a4 | M' b4,S' b4 | M' c4,S' c4 | M' d4,S' d4 | M' e4,S' e4 | M' f4,S' f4 | M' g4,S' g4 | M' h4,S' h4 |
| HEALING | M' a5,S' a5 | M' b5,S' b5 | M' c5,S' c5 | M' d5,S' d5 | M' e5,S' e5 | M' f5,S' f5 | M' g5,S' g5 | M' h5,S' h5 |
| LONELY | M' a6,S' a6 | M' b6,S' b6 | M' c6,S' c6 | M' d6,S' d6 | M' e6,S' e6 | M' f6,S' f6 | M' g6,S' g6 | M' h6,S' h6 |

MUSIC SELECTING APPARATUS AND METHOD

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a music selecting apparatus and method which selects one of a plurality of music pieces.

2. Description of the Related Art

A well-known method to select a music piece preferred by a user of a plurality of music pieces involves extracting as data the physical characteristics of music pieces, classifying the plurality of music pieces in accordance with the extraction results, and using the result for music selection. As a method for obtaining physical characteristic data of each music piece, for example, a method for obtaining power spectrum data from music data is widely known (see Japanese Patent Application Kokai No. 10-134549). A method for obtaining physical characteristic data through the patterning of time-series changes using an N-gram method, based on the frequency bandwidth and the length of the reproduced sound of the music piece and the musical score, is also known.

However, in such conventional music selection methods, the physical characteristic data is not data which has a correlation with the sensitivities of the user. Hence there is the problem that the music piece imagined by the user is not necessarily selected.

SUMMARY OF THE INVENTION

It is an object of the present invention to provide a music selecting apparatus and method capable of providing a music piece appropriate to the sensitivities of the user.

A music selecting apparatus according to the present invention is an apparatus for selecting a music piece from a plurality of music pieces in accordance with an input operation, comprising: a first storage device which stores, as data, a degree of chord change for each of the plurality of music pieces; a setting device which sets a sensitivity word for music selection in accordance with the input operation; and, a music selector which detects a music piece having a degree of chord change corresponding to the sensitivity word set by the setting device, in accordance with the chord change degree for each of the plurality of music pieces.

A music selecting method according to the present invention is a method for selecting a music piece from among a plurality of music pieces in accordance with an input operation, comprising the steps of: storing, as data, a degree of chord change for each of the plurality of music pieces; setting a sensitivity word for music selection in accordance with the input operation; and, detecting a music piece having a degree of chord change corresponding to the set sensitivity word, in accordance with the chord change degree for each of the plurality of music pieces.

A music selecting apparatus according to the present invention is an apparatus for selecting a music piece from among a plurality of music pieces in accordance with an input operation, comprising: a first storage device which stores, as data, a characteristic value of at least one characteristic parameter for each of the plurality of music pieces; a setting device which sets a sensitivity word for music selection from among a plurality of sensitivity words, in accordance with the input operation; a second storage device which stores, as data, a correction value for each of the plurality of sensitivity words; a reading portion which reads, from the second storage device, the correction value corresponding to the sensitivity word for the music selection set by the setting device; a correction device which corrects the characteristic value of characteristic parameter for each of the plurality of music pieces in accordance with correction value read by the reading portion to compute a sensitivity matching degree; a music selector which selects at least one music piece from among the plurality of music pieces, in accordance with the sensitivity matching degree for each of the plurality of music pieces, computed by the correction device; a matching judgment device which judges whether the at least one music piece selected by the music selector matches the sensitivity word for the music selection, in accordance with an input operation; a learning value storage device which computes a learning value in accordance with a result of the judgment by the matching judgment device, and stores the computed learning value in association with the sensitivity word for the music selection; and, a learning judgment device which judges, when the sensitivity word for the music selection is set by the setting device, whether the learning value corresponding to the sensitivity word for the music selection exist in the learning value storage device; and wherein when the learning value corresponding to the sensitivity word for the music selection is judged by the learning judgment device to be stored in the learning value storage device, the correction device corrects the characteristic value of characteristic parameter for each of the plurality of music pieces in accordance with the stored learning value to compute the sensitivity matching degree.

A music selecting method according to the present invention is a method for selecting a music piece from among a plurality of music pieces in accordance with an input operation, comprising the steps of: storing a characteristic value of at least one characteristic parameter as data for each of the plurality of music pieces; setting a sensitivity word for music selection from among a plurality of sensitivity words in accordance with the input operation; storing a correction value as data for each of the plurality of sensitivity words in a second storage device; reading the correction value corresponding to the sensitivity word for the music selection from the second storage device; correcting characteristic value of characteristic parameters for each of the plurality of music pieces in accordance with the read correction value to compute a sensitivity matching degree; selecting at least one music from among the plurality of music pieces in accordance with the sensitivity matching degrees computed for each of the plurality of music pieces; judging whether the selected music piece matches the sensitivity word for the music selection, in accordance with the input operation; computing a learning value in accordance with the judgment result, and storing the computed learning value in a learning value storage device in association with the sensitivity word for the music selection; judging whether the learning value corresponding to the sensitivity word for the music selection exists in the learning value storage device at the time the sensitivity word for the music selection is set; and, when it is judged that the learning value corresponding to the sensitivity word for the music selection is stored in the learning value storage device, correcting the characteristic value of characteristic parameter for each of the plurality of music pieces in accordance with the stored learning value to compute the sensitivity matching degree.

BRIEF DESCRIPTION OF THE DRAWINGS

FIG. 2 shows a default database;

FIG. 9 shows a second personal learning value database having unmatched music data; and, FIG. 10 is a flowchart showing a portion of music selection operation to which the learning routine of FIG. 7 is applied.

DETAILED DESCRIPTION OF THE INVENTION

Figure 1:
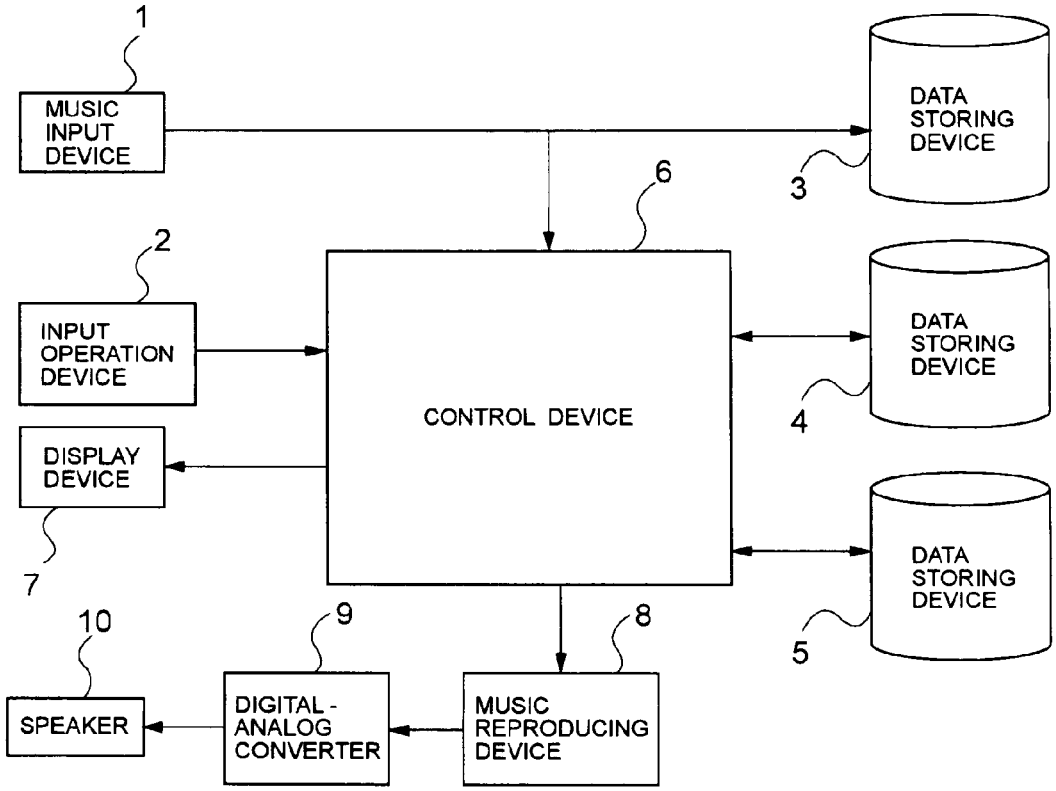
FIG. 1 is a block diagram showing the configuration of a music selecting apparatus according to the present invention.

Below, embodiments of the invention are explained in detail, referring to the drawings.

FIG. 1 shows a music selecting apparatus according to the present invention. The music selecting apparatus comprises a music input device 1, input operation device 2, data storing devices 3, 4 and 5, control device 6, display device 7, music reproducing device 8, digital-analog converter 9, and speaker 10.

The music input device 1 is connected to the control device 6 and data storing device 3, and is a device for input of audio signals (for example, PCM data) of digitized music pieces to the music selecting apparatus. As the music input device 1, for example, a disc player which plays a disc such as CD, or a streaming interface which receives streaming music data, is employed. The input operation device 2 is a device operated by the user of the music selecting apparatus to input data and instructions. In addition to character keys and numeric keys, the input operation device 2 is provided with a "YES" key, a "NO" key, an "END" key, a "NEXT MUSIC" key, and other specialized keys. The output of the input operation device 2 is connected to the control device 6. The types of keys of the input operation device 2 are not necessarily limited to those described above.

The data storing device 3, which is the third storage means, stores, as files, music data supplied from the music input device 1. Music data is data indicating the reproduced sounds of a music piece, and may be, for example, PCM data, MP3 data, MIDI data, or similar. The music name, singer name, and other music information is stored for each music piece in the data storing device 3. Music data accumulated in the data storing device 3 corresponds to a plurality of music pieces 1 through n (where n is greater than one). The data storing device 4 stores as a characteristic parameter database (first storage device), for each of the n music pieces for which music data is accumulated in the data storing device 3, characteristic values for the degree of chord change (1), degree of chord change (2), degree of chord change (3), beat (number of beats per unit time), maximum beat level, mean amplitude level, maximum amplitude level, and the key, as characteristic parameters. The degree of chord change (1) is the number of chords per minute in the music piece; the degree of chord change (2) is the number of types of chords used in the music piece; and the degree of chord change (3) is the number of change points, such as discord, which change an impression of the music piece during the chord progression.

Chords themselves have elements which may provide depth to a music piece, or impart a sense of tension to the listener, or similar. Further, a music piece may be provided with atmosphere through a chord progression. Chords having such psychological elements are optimal as music-characterizing quantities used by a music selecting apparatus to select music pieces through sensitivity words, and in addition to the simple characteristics of the melody, it is thought that the intentions of the composer, including the contents of the lyrics, may to some extent be reflected therein; hence chords are employed as a portion of the characteristic parameters.

In the data storing device 4, for each sensitivity word previously determined are stored, as the default database (second storage device), an average value and an unbiased variances for characteristic parameters, comprising the degree of chord change (1), degree of chord change (2), degree of chord change (3), beat, maximum beat level, mean amplitude level, maximum amplitude level, and the key. The average value and unbiased variance represent a characteristic value for each of the characteristic parameters, as well as a correction value used for computation of a sensitivity matching degree. The average value and unbiased variance are described below. FIG. 2 shows, in a table, the average values and unbiased variances of each of the characteristic parameters for different sensitivity words, which are the contents of the default database. In FIG. 2, Ma1 to Ma6, Mb1 to Mb6, and similar are average values, and Sa1 to Sa6, Sb1 to Sb6, and similar are unbiased variances.

Here, the sensitivity word is a word expressing feelings felt when a listener listens to a music piece. Examples are "rhythmical", "gentle", "bright", "sad" "healing", and "lonely".

A matched music database (fourth storage device) and unmatched music database (sixth storage device) are formed in the data storing device 5. In each of these databases is stored data for 50 music pieces for each sensitivity word. When music data for more than 50 music pieces is to be written, the new data is written while erasing the oldest data. Of course the number of music pieces stored for each sensitivity word in the matched music database and in the unmatched music database is not limited to 50 music pieces, but may be a different number of music pieces.

The control device 6 comprises for example a microcomputer, and performs music selection operation in accordance with an input operation by a user, described below.

The display device 7 displays selection fields related to the control of the control device 6, the contents input to the music input device 1, and a list of music pieces presented to the user.

The music reproducing device 8 reads music data for a music piece selected by the user from the data storing device 3, and reproduces a digital audio signal in accordance with the read music data. The digital-analog converter 9 converts the digital audio signals reproduced by the music reproducing device 8 into analog audio signals, which are supplied to the speaker 10.

Next, music selection operation in a music selection system of this configuration is explained. It is assumed that a single user uses the music selecting apparatus; in the case of a device used by a plurality of users, when starting the music selection operation, a user ID identifying the user must be input via the input operation device 2. This is in order to specify the user utilizing personal learning values, described below.

Figure 3:
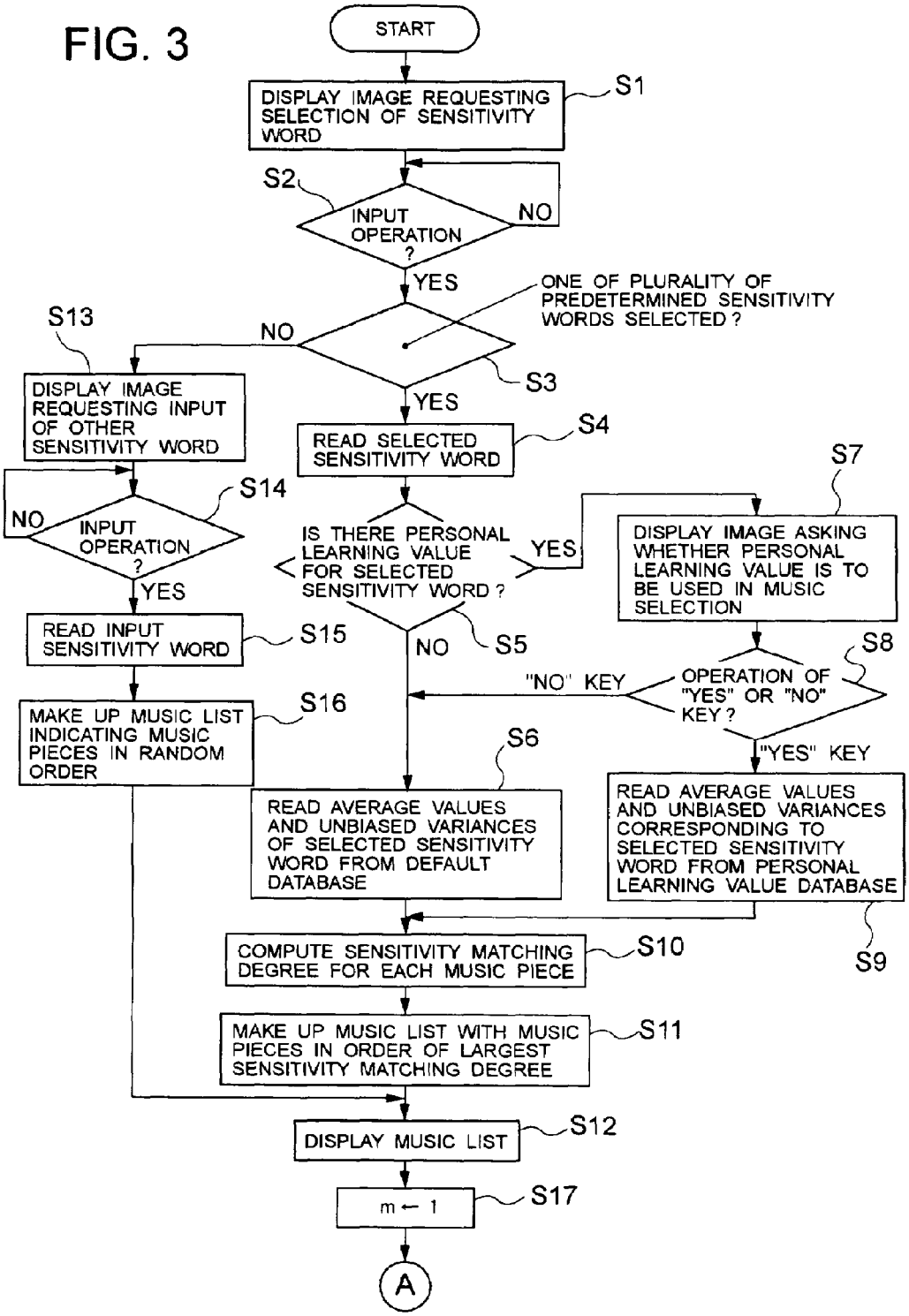
FIG. 3 is a flowchart showing music selection operation.
Figure 4:
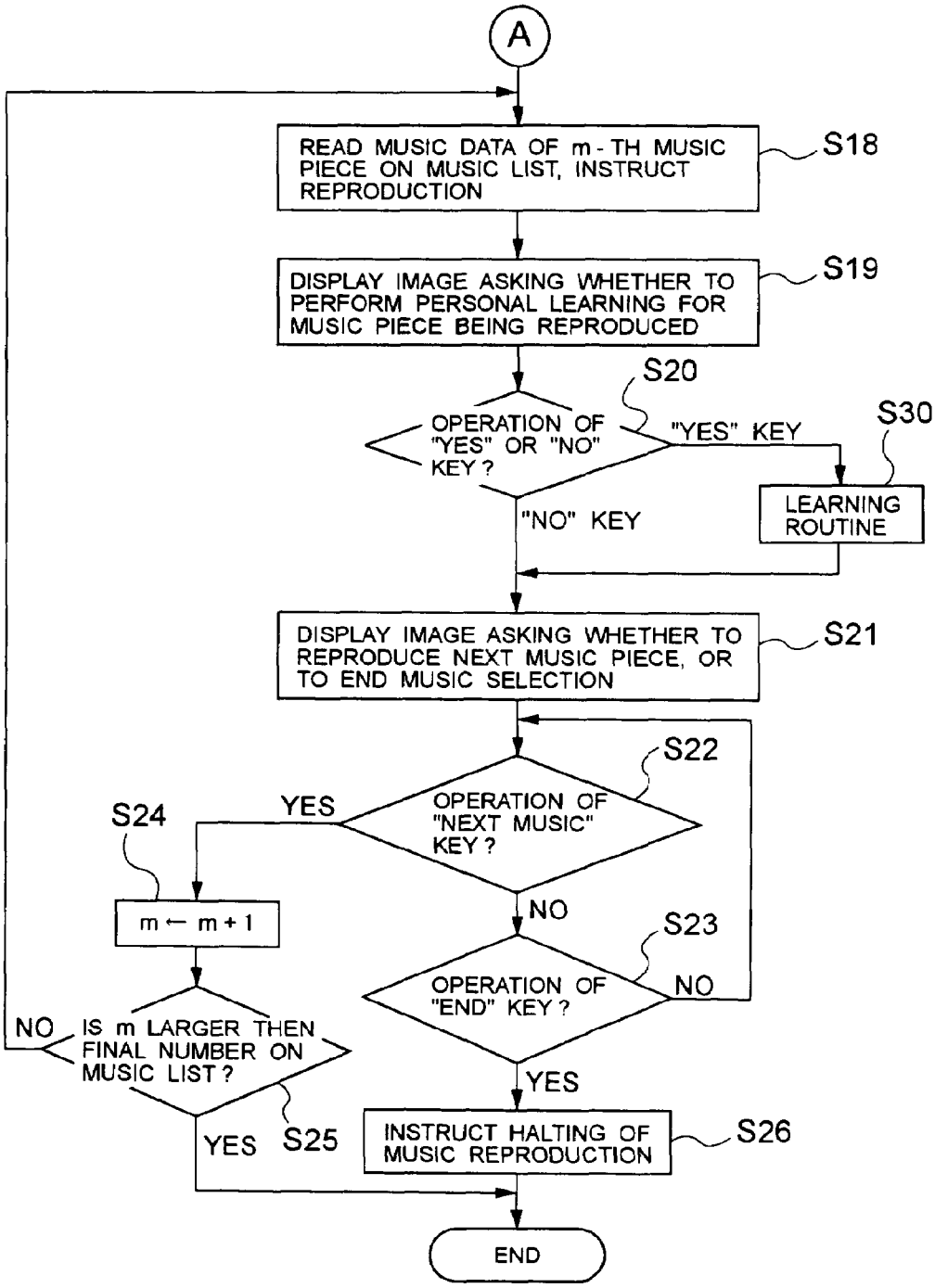
FIG. 4 is a flowchart showing the continuous portion of the music selection operation of FIG. 3.

When music selection operation begins, the control device 6 first causes the display device 7 to display an image in order to request selection of a sensitivity word, as shown in FIG. 3 and FIG. 4 (step S1). As sensitivity words for music selection, "rhythmical", "gentle", "bright", "sad", "healing", "lonely", and other items are displayed on the screen of the display device 7, and in addition an "other sensitivity word" items is displayed. At the same time, an instruction to select from among these displayed items is shown. The user can perform an input operation through the input operation device 2 to select one of these sensitivity words or another sensitivity word in response to the display. After executing step S1, the control device 6 judges whether there has been operation input (step S2). If there has been operation input, the control device 6 judges whether one of the sensitivity words displayed has been selected, in accordance with the output from the input operation device 2 (step S3). That is, a judgment is made as to whether one sensitivity word of the sensitivity words displayed, or "other sensitivity word", has been selected.

If one of the displayed sensitivity words has been selected, the control device 6 captures the selected sensitivity word (step S4), and judges whether, for the selected sensitivity word, there exist personal learning values (step S5). The personal learning values are the average value and unbiased variance, specific to the user, of each of the characteristic parameters for the selected sensitivity word; the average values and unbiased variances are computed in a step described below, and stored in a personal-learning value database (fifth storage device) in the data storing device 4. If personal learning values for the selected sensitivity word do not exist in the data storing device 4, an average value and an unbiased variance for each of the characteristic parameters corresponding to the selected sensitivity word are read from the default database (step S6). On the other hand, if personal learning values for the selected sensitivity word exist in the data storing device 5, an image asking the user whether to select a music piece using the personal learning values is displayed on the display device 7 (step S7). The user can perform an input operation on a "YES" key or a "NO" key using the input operation device 2, based on the display, to select whether or not to use personal learning values. After execution of step S7, the control device 6 judges whether there has been input operation of the "YES" key or of the "NO" key (step S8). If there is input operation of the "YES" key indicating that personal learning values are to be used, the average value and unbiased variance of each of the characteristic parameters corresponding to the selected sensitivity word are read from the personal learning value database (step S9). If there is input operation of the "NO" key indicating that personal learning values are not to be used, processing proceeds to step S6, and the average value and unbiased variance of each of the characteristic parameters corresponding to the selected sensitivity word are read from the default database.

Upon reading the average values and unbiased variances of each of the characteristic parameters in step S6 or in step S9, the control device 6 computes a sensitivity matching degree for each of the n music pieces (step S10). The sensitivity matching degree for the i-th music piece is computed as follows.

$$\text{Sensitivity matching degree}=(1/|a(i)-Ma|)\times(1/Sa)+(1/|b(i)-Mb|)\times(1/Sb)+(1/|c(i)-Mc|)\times(1/Sc)+(1/|d(i)\times Md|)\times(1/Sd)+(1/|e(i)-Me|)\times(1/Se)+(1/|f(i)-Mf|)\times(1/Sf)+(1/|g(i)-Mg|)\times(1/Sg)+(1/|h(i)-Mh|)\times(1/Sh)$$

In this formula, the degree of chord change (1) of the i-th music piece is a(i), the degree of chord change (2) of the i-th music piece is b(i), the degree of chord change (3) of the i-th music piece is c(i), the beat of the i-th music piece is d(i), the maximum beat level of the i-th music piece is e(i), the mean amplitude level of the i-th music piece is f(i), the maximum amplitude level of the i-th music piece is g(i), and the key of the i-th music piece is h(i). Assume that the selected sensitivity word is A, and the average values and unbiased variances for this sensitivity word A are Ma, Sa for the degree of chord change (1), Mb, Sb for the degree of chord change (2), Mc, Sc for the degree of chord change (3), Md, Sd for the beat, Me, Se for the maximum beat level, Mf, Sf for the mean amplitude level, Mg, Sg for the maximum amplitude level, and Mh, Sh for the key.

Further, when computing the sensitivity matching degree, the units of numerical values differ depending on the characteristic parameter, and so levels may be adjusted. In the formula to compute the sensitivity matching degree, for example, the degree of chord change (1) may be computed as $(100/|a(i)-Ma|)\times(1/Sa)$, increasing the value by a factor of 100.Other degrees of chord change and the beat may similarly be increased by a factor of 100.

Upon computing the sensitivity matching degree for each of n music pieces, the control device 6 makes up a music list showing music pieces in order of the greatest sensitivity matching degree (step S11), and causes the display device 7 to display an image showing this music list (step S12). The screen of the display device 7 shows music names, singer names, and other music information, read from the data storing device 3, and displayed with music pieces in the order of greatest sensitivity matching degree.

There are cases in which, in step S3, "other sensitivity word" is selected; that is, the user desires a music piece which conforms to a sensitivity word other than the sensitivity words prepared in advance. In such a case, the control device 6 causes the display device 7 to display an image to request input of a sensitivity word (step S13). The user can use the input operation device 2 to input, as text, any arbitrary sensitivity word, in accordance with the displayed instructions. After execution of step S13, the control device 6 judges whether text has been input (step S14). If there has been input, the control device 6 captures and stores the input text as a sensitivity word (step S15). The control device 6 uses the music pieces 1 through n for which music data is accumulated in the data storing device 3 to make up a random music list (step S16), and then proceeds to the above step S12 and causes the display device 7 to display an image showing this music list. On the screen of the display device 7 are listed, in random order, the names, singers, and other music information for the music pieces.

The sensitivity word captured at step S15 can be included in the sensitivity words displayed at step S1 of the next music selection operation.

After execution of step S12, the variable m is set to 1 (step S17), music data for the m-th music piece in the music list is read from the data storing device 3 and is supplied to the music reproducing device 8, to specify music reproduction (step S18). The music reproducing device 8 reproduces a digital signal on the music data for the m-th music piece thus supplied, and the digital signal is supplied to the digital-analog converter 9. After conversion into analog audio signals in the digital-analog converter 9, reproduced sounds for the m-th music piece are output from the speaker 10. Thus, the user can listen to the reproduced sounds of the music piece.

An image is displayed on the display device 7 to ask the user whether or not to perform personal learning for the music piece being reproduced (step S19). The user can use the input operation device 2 to operate the "YES" key or the "NO" key, in accordance with the displayed contents, to select whether or not to perform personal learning for the music piece being reproduced. After execution of step S19, the control device 6 judges whether there has been operation input of the "YES" key or of the "NO" key (step S20). If there has been input due to operation of the "YES" key, indicating that personal learning is to be performed, processing proceeds to the learning routine.

If there has been input of the "NO" key indicating that personal learning is not to be performed, the display device 7 is caused to display an image asking the user whether to proceed to reproduction of the next music piece on the list of music pieces, or whether to halt music selection (step S21). By operating the input operation device 2 in accordance with the displayed contents, the user can begin reproduction of the next music piece on the displayed music list after the music piece currently being reproduced, or can halt music selection without selecting another music piece. After execution of step S21, the control device 6 judges whether there has been input operation of the "NEXT MUSIC" key (step S22). If there has not been input operation of the "Next music" key, the control device judges whether there has been operation of the "END" key (step S23).

If there has been input of the "NEXT MUSIC" key, the variable m is increased by 1 to compute the new value of the variable m (step S24), and a judgment is made as to whether the variable m is greater than the final number MAX of the music list (step S25). If m>MAX, the music selection operation ends. On the occasion of this ending, the display device 7 may be caused to display an image informing the user that music pieces have been reproduced up to the final number of the music list. On the other hand, if m<MAX, processing returns to step S18 and the above operations are repeated.

If there has been input of the "END" key, the music reproducing device 8 is instructed to halt music reproduction (step S26). By this means music selection by the control device 6 ends; but processing may also return to step S1.

Figure 5:
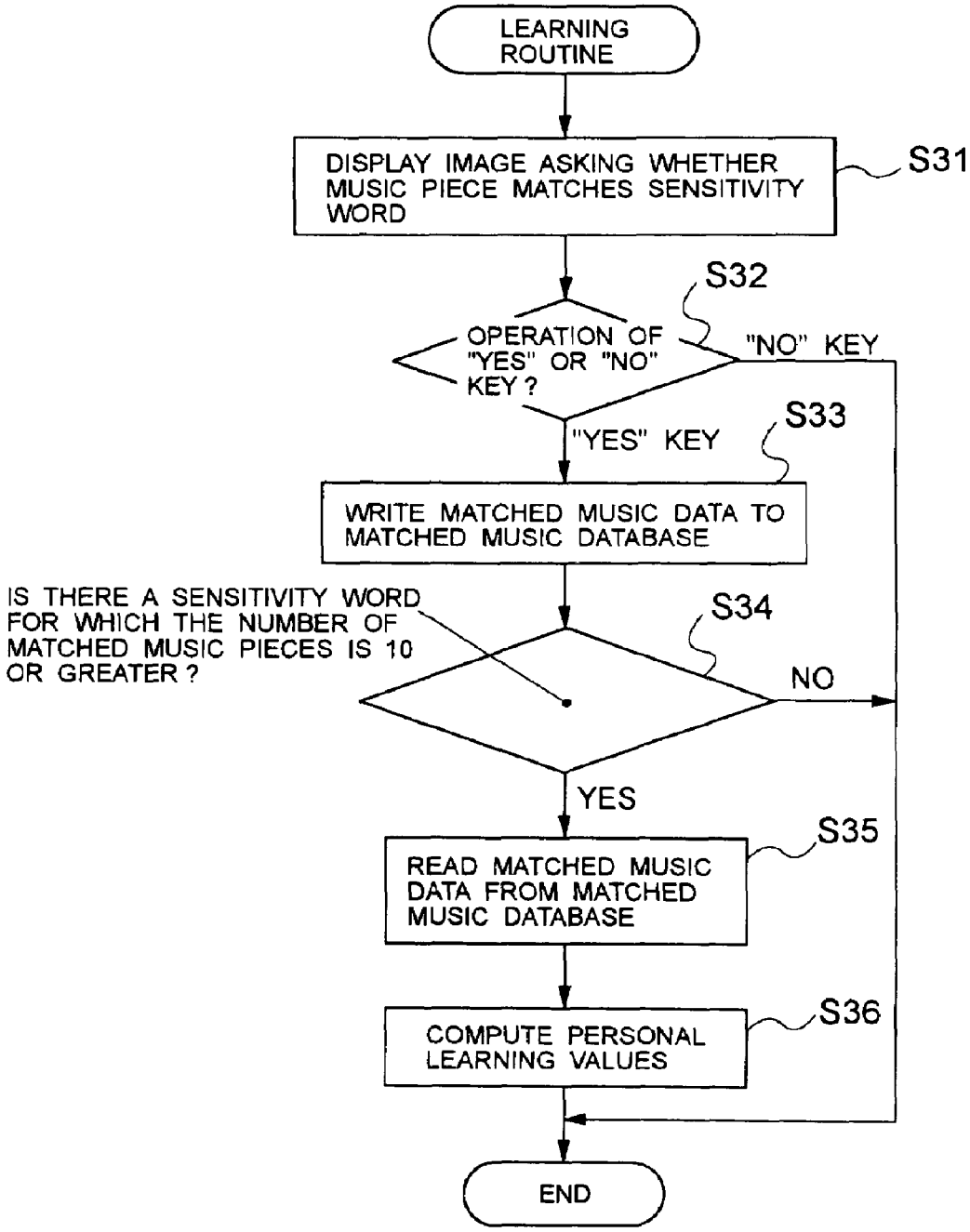
FIG. 5 is a flowchart showing a learning routine.

When execution of the above learning routine has been begun, the control device 6 first causes the display device 7 to display an image to ask the user whether the music piece currently being reproduced is a music piece which matches the sensitivity word which has been selected or input, as shown in FIG. 5 (step S31). The user can use the input operation device 2 to input "YES" or "NO", in accordance with the displayed contents, to select whether or not the music piece being reproduced matches the sensitivity word. After execution of step S26, the control device 6 judges whether there has been input using either the "YES" key or the "NO" key (step S32). If there is input using the "YES" key, indicating that the music piece being reproduced matches the sensitivity word, matched music data indicating this music piece is written to the matched music database of the data storing device 5 (step S33). On the other hand, if there is input using the "NO" key, indicating that the music piece being reproduced does not match the sensitivity word, the learning routine is ended and processing returns to the above step S21.

After execution of step S33, the control device 6 judges whether there is a sensitivity word for which the number of matched music pieces written as matched music data to the matched music database has reached 10 music pieces (a predetermined number of music pieces) (step S34). If it is judged that there is a sensitivity word for which the number of matched music pieces is 10 music pieces or greater, matched music data is read from the matched music database of the data storing device 5, unmatched music data is read from a unmatched music database (step S35), and the read data is used to compute personal learning values using statistical processing (step S36). In step S34, the predetermined number of music pieces is stipulated to be 10 music pieces, but another value for the number of music pieces may be used.

Figure 6:
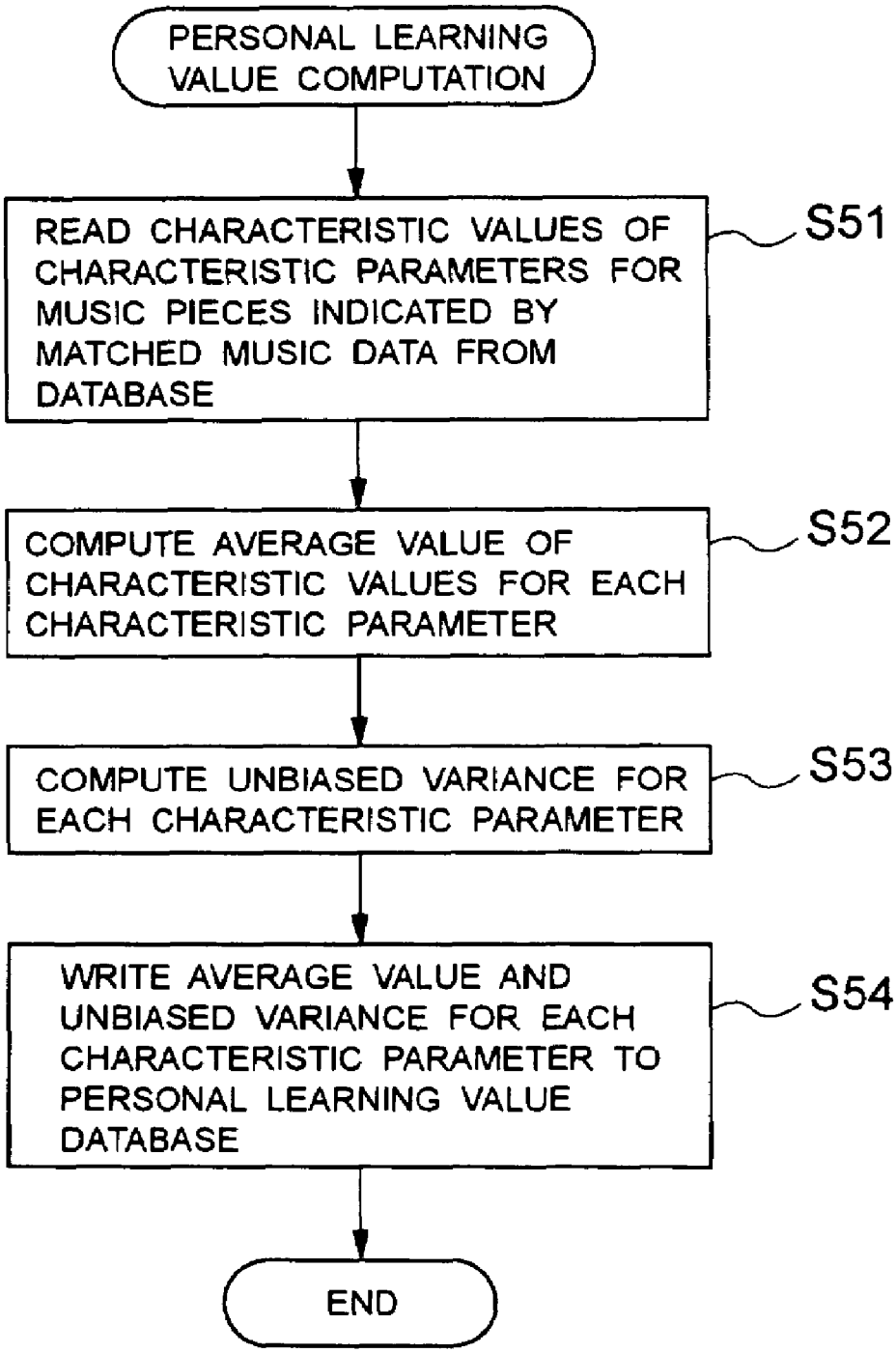
FIG. 6 is a flowchart showing personal learning value computation operation.

Computation of personal learning values is explained for a sensitivity word A, for which the number of matched music pieces has reached 10 or greater. As shown in FIG. 6, a characteristic value for each of the characteristic parameters (degree of chord change (1), degree of chord change (2), degree of chord change (3), beat (number of beats per unit time), maximum beat level, mean amplitude level, maximum amplitude level, and key) for each music piece indicated by the matched music data corresponding to the sensitivity word A in the matched music database is read from the characteristic parameter database of the data storing device 4 (step S51), and the average value Mave of the read characteristic values for each characteristic parameter are computed (step S52). Further, the unbiased variance S for each characteristic parameter is also computed (step S53). When computing the unbiased variance S of one characteristic parameter of the sensitivity word A, if the music pieces indicated by the matched music data corresponding to the sensitivity word A are M1 to Mj (where for example $50 \geqq j \geqq 10$), and the characteristic values of one characteristic parameter for the respective music pieces M1 to Mj are C1 to Cj, then the average value Mave of the characteristic values C1 to Cj for one characteristic parameter can be expressed by $$Mave=C1+C2+\ldots+Cj/j$$

The unbiased variance S of a characteristic parameter of the sensitivity word A can be expressed by $$S=\{(Mave-C1)^2+(Mave-C2)^2+\ldots+(Mave-Cj)^2\}/(j-1)$$

The control device 6 writes the average value Mave and unbiased variance S computed for each characteristic parameter into fields for the respective characteristic parameters corresponding to the sensitivity word A in the personal learning value database (step S54).

After thus computing personal learning values, the control device 6 returns to the above step S21, and continues operation as described above.

Through this music selection operation, a music list conforming to a selected sensitivity word can be presented to the user. Further, in music selection using personal learning values, as a user utilizes this music selection system, it becomes possible to provide music pieces which more closely conform to the sensitivities of the user.

In the above embodiment, the degree of chord change (1), degree of chord change (2), degree of chord change (3), beat (number of beats per unit time), maximum beat level, mean amplitude level, maximum amplitude level, and the key are described as characteristic parameters, but others are possible. Also, the sensitivity matching degree may be computed for at only at least one of the three degrees of chord change (1) through (3).

Further, degrees of chord change are not limited to the above-described number of chords per minute in the music piece, number of types of chords used in the music piece, and number of change points, such as discord, which impart an impression of the music piece during the chord progression. For example, the amount of change in the chord root, or a change from a major chord to a minor chord, or the number of changes to other types of chords, can also be used as degrees of chord change.

In the above-described embodiment, average values and unbiased variances are used as correction values, but other values may be used. In place of unbiased variances, for example, a multiplicative factor, variance or other weighting value to correct a degree of chord change or other characteristic value may be used. When using a variance in place of an unbiased variance, the variance of one characteristic parameter for sensitivity word A as described above can be expressed by the following equation. The unmatched music data for the music piece is written to the unmatched music database of the data storing device 5 (step S34).

$$\text{Variance}=\{(\text{Mave}-\text{C1})^2+(\text{Mave}-\text{C2})^2+\ldots+(\text{Mave}-\text{Cj})^2\}/j$$

Figure 7:
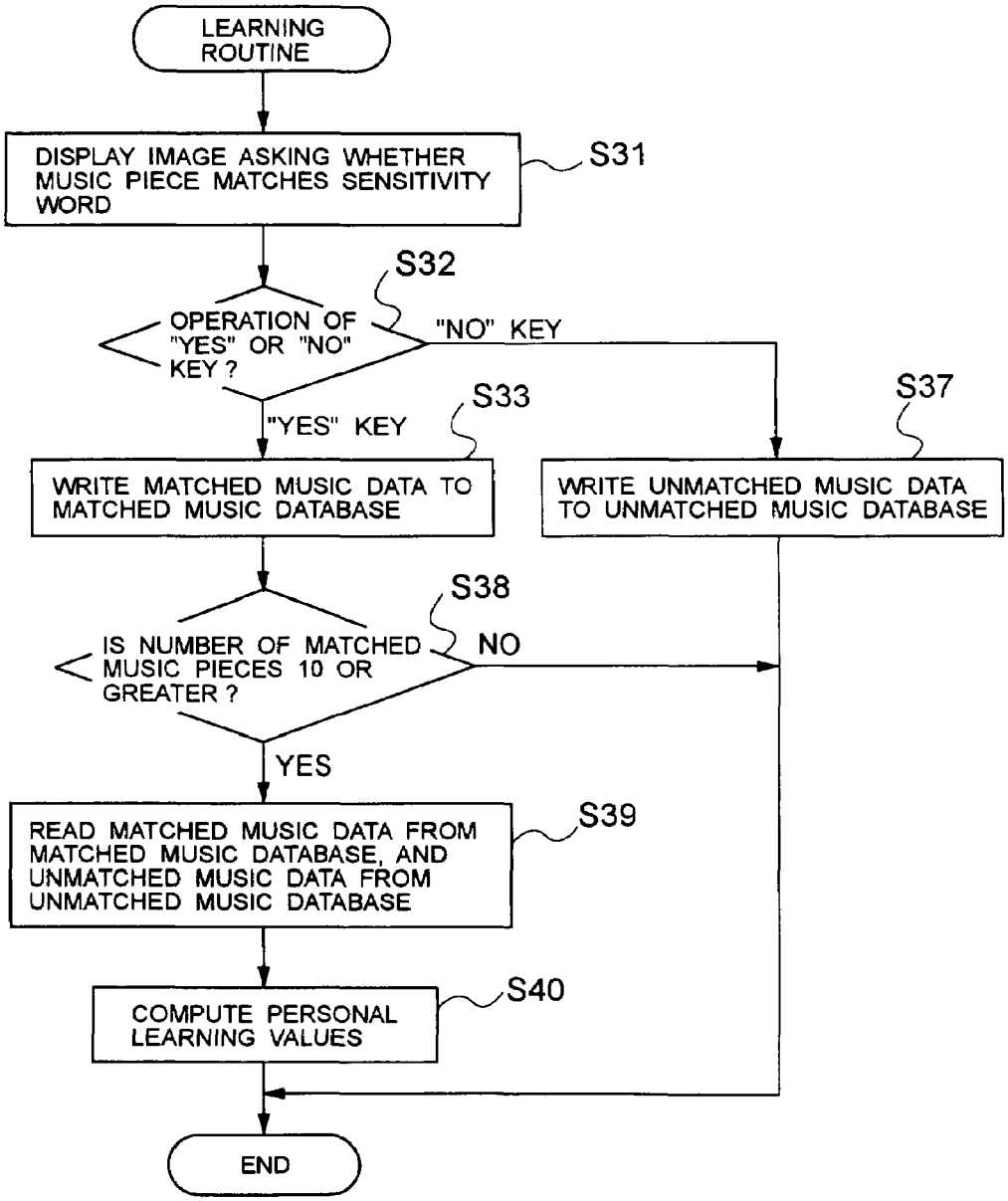
FIG. 7 is a flowchart showing another example of the learning routine.

FIG. 7 shows another example of a learning routine in the above step S30. In this learning routine, if there is input operation of the "YES" key indicating a match of the music piece being reproduced in step S32 with a sensitivity word, the control device 6 writes matched music data indicating the music piece to the matched music database of the data storing device 5 (step S33); on the other hand, if there is input operation of the "NO" key indicating that the music piece being reproduced does not match the sensitivity word, unmatched music data indicating the music piece is written to the unmatched music database (sixth storage device) of the data storing device 5 (step S37), the learning routine is ended, and processing proceeds to the above step S21.

After execution of step S33, the control device 6 judges whether the number of matched music pieces written as matched music data to the matched music database has reached 10 music pieces (a predetermined number of music pieces) (step S38). If the number of matched music pieces is judged to be 10 or greater, matched music data is read from the matched music database of the data storing device 5, unmatched music data is read from the unmatched music database (step S39), and the read data is used to compute personal learning values through statistical processing (step S40). In step S38, the predetermined number of music pieces is stipulated to be 10 music pieces, but of course a different value for the number of music pieces may be used.

Figure 8:
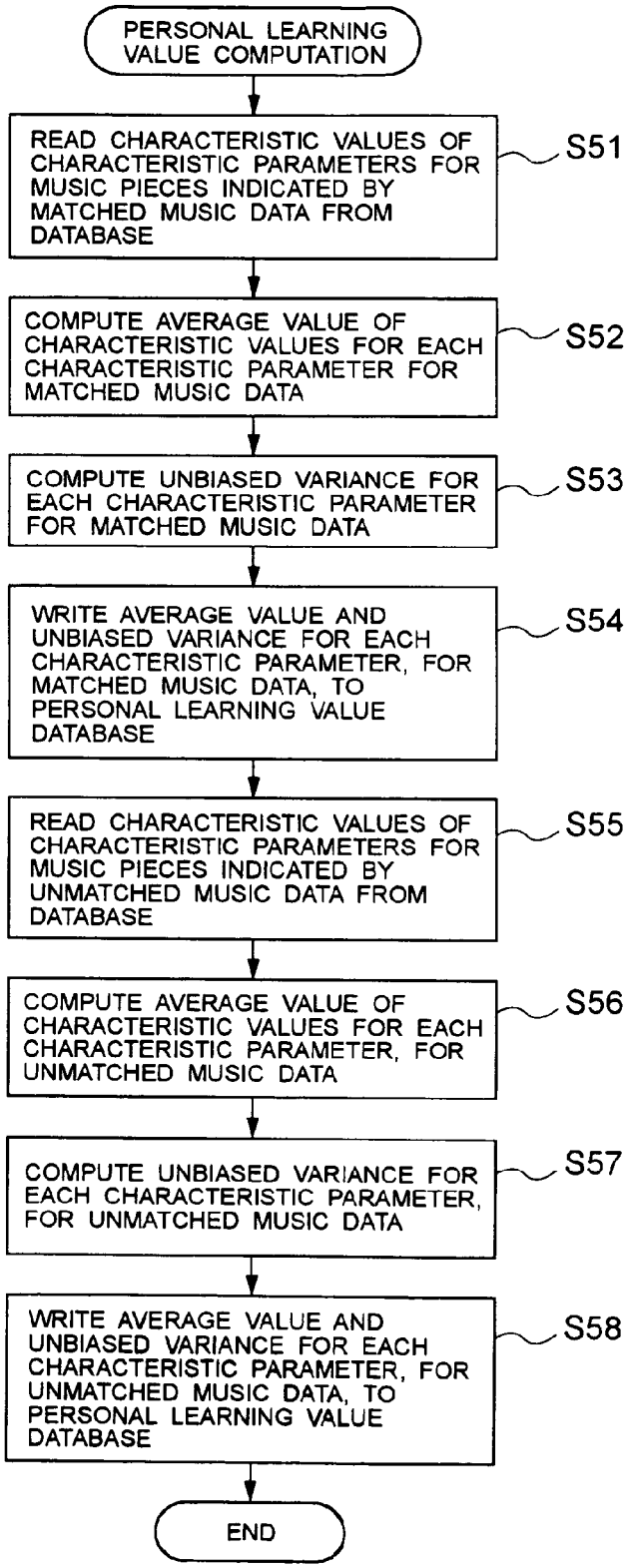
FIG. 8 is a flowchart showing personal learning value computation operation in the learning routine of FIG. 7.

In the personal learning value computation of step S40, as shown in FIG. 8, an average value Mave and an unbiased variance S of a characteristic value for each characteristic parameter are computed for a sensitivity word A using the matched music data, and these values are written to the fields for the respective characteristic parameters corresponding to the sensitivity word A in the personal learning value database (steps S51 to S54). Thereafter, a characteristic value for each of the characteristic parameters for each music piece indicated by unmatched music data for the sensitivity word A in the unmatched music database is read from the characteristic parameter database of the data storing device 4 (step S55), and the average value Mave' of characteristic values is computed for each characteristic parameter using the unmatched music data (step S56). Also, the unbiased variance S' is computed for each characteristic parameter using the unmatched music data (step S57). The methods for computing the average value Mave' and unbiased variance S' are similar to those used for the average value Mave and unbiased variance S.

The control device 6 writes the average value Mave' and unbiased variance S' computed for each characteristic parameter to the respective characteristic parameter fields corresponding to the sensitivity work A in the personal learning value database (step S58). The personal learning values computed based on this unmatched music data are stored in a second personal learning value database (seventh storage device) as shown in FIG. 9. In FIG. 9, M'a1 to M'a6, M'b1 to M'b6, and so on are average values, and S'a1 to S'a6, S'b1 to S'b6, and so on are unbiased variances. Only the average values Mave' may be used as personal learning values for unmatched music data.

Figure 10:
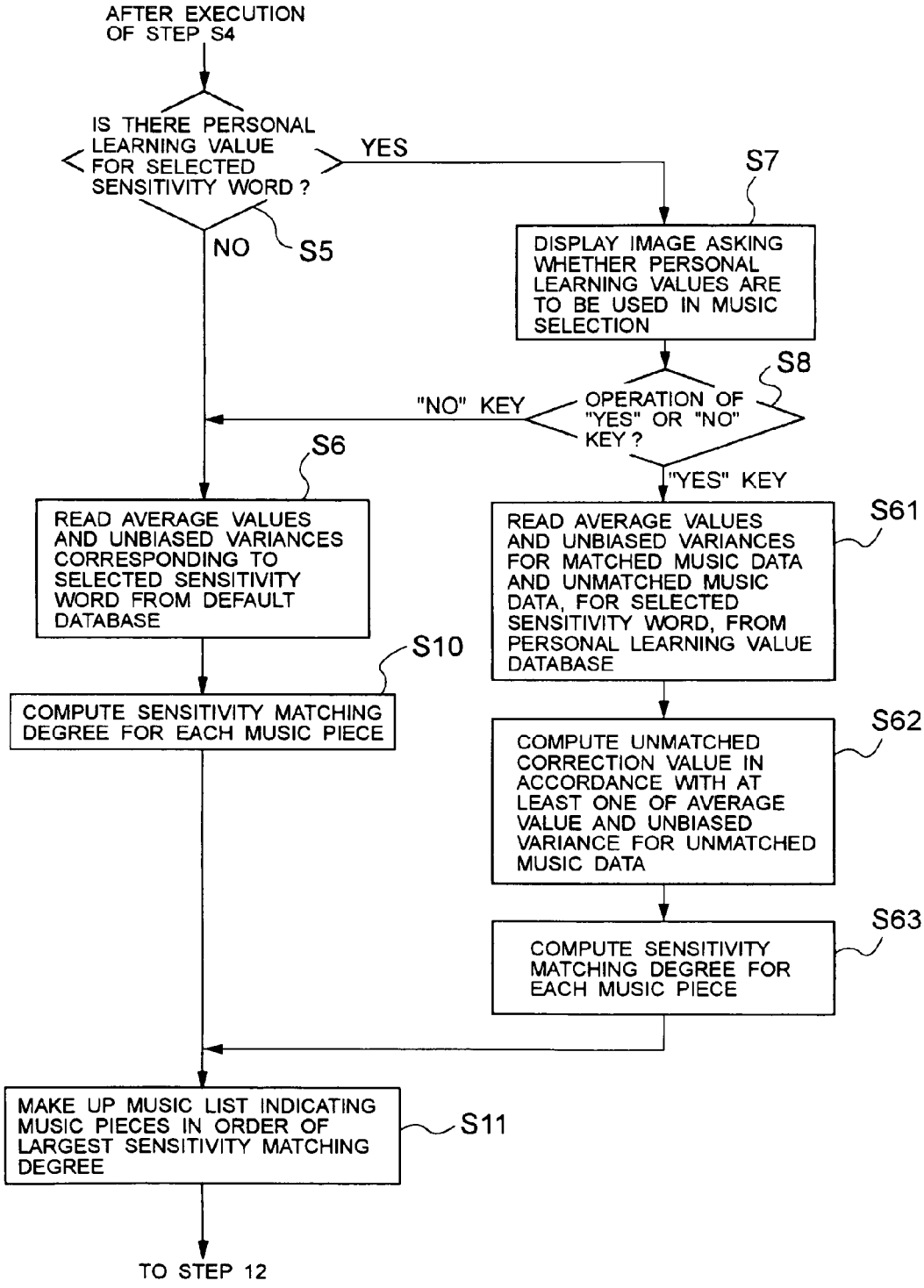

When providing personal learning values for unmatched music data, when in music selection operation there is input operation of the "YES" key in step S8 indicating that personal learning values are to be used, as shown in FIG. 10, average values and unbiased variances are read from the personal learning value database for matched music data and for unmatched music data for each of the characteristic parameters corresponding to the selected sensitivity word (step S61), and in addition, an unmatched correction value is computed in accordance with at least one of the average value and unbiased variance for the unmatched music data (step S62). The unmatched correction value is computed by, for example, multiplying the average value by a coefficient, or by multiplying the reciprocal of the unbiased variance by a coefficient. The coefficient is specified for each of the characteristic parameters.

After execution of step S62, the control device 6 computes a sensitivity matching degree for each of n music pieces (step S63). The sensitivity matching degree is computed using the following equation. In this equation, $\alpha a$, $\alpha b$, $\alpha c$, $\alpha d$, $\alpha e$, $\alpha f$, $\alpha g$, $\alpha h$ are unmatched correction values, computed in step S62, for the characteristic parameters, which are the degree of chord change (1), degree of chord change (2), degree of chord change (3), beat (number of beats per unit time), maximum beat level, mean amplitude level, maximum amplitude level, and the key, respectively.

$$\text{Sensitivity matching degree}=\{(1/|a(i)-Ma|)\times(1/Sa)-\alpha a\}+\{(1/|b(i)-Mb|)\times(1/Sb)-\alpha b\}+\{(1/|c(i)-Mc|)\times(1/Sc)-\alpha c\}+\{(1/|d(i)-Md|)\times(1/Sd)-\alpha d\}+\{(1/|e(i)-Me|)\times(1/Se)-\alpha e\}+\{(1/|f(i)-Mf|)\times(1/Sf)-\alpha f\}+\{(1/|g(i)-Mg|)\times(1/Sg)-\alpha g\}+\{(1/|h(i)-Mh|)\times(1/Sh)-\alpha h\}$$

The unmatched correction values $\alpha a$, $\alpha b$, $\alpha c$, $\alpha d$, $\alpha e$, $\alpha f$, $\alpha g$, $\alpha h$ act so as to reduce the sensitivity matching degree computed using matched music data based on personal learning values.

In step S63, after computation of sensitivity matching degrees, processing proceeds to step S11 and a music list is made up, similarly to the music selection operation of FIG. 3.

The method for computing the sensitivity matching degree is not limited to the above example. For example, the following equation may also be used in computation. Here $\sigma$ is the standard deviation computed from characteristic values of matched music data.

$$\text{Sensitivity matching degree}=\{(1/a(i)-Ma)^2)\times(\sigma/Sa)-\alpha a\}+\{(1/b(i)-M\ )^2)\times(\sigma/Sb)-\alpha b\}+\{(1/c(i)-Mc)^2)\times(\sigma/Sc)-\alpha c\}+\{(1/d(i)-Md)^2)\times(\sigma/Sd)-\alpha d\}+\{(1/e(i)-Me)^2)\times(\sigma/Se)-\alpha e\}+\{(1/f(i)-Mf)^2)\times(\sigma/Sf)-\alpha f\}+\{(1/g(i)-Mg)^2)\times(\sigma/Sg)-\alpha g\}+\{(\sigma/h(i)-Mh)^2)\times(\sigma/Sh)-\alpha h\}$$

In the above embodiment, "rhythmical", "gentle", "bright", "sad" "healing", and "lonely" are selected sensitivity words, but other sensitivity words may be used. For example, "joyful" or other sensitivity words may of course be used.

Thus, according to the present invention, music pieces matching with the sensitivities of the user can be presented to the user, so that music selection by the user becomes easy.

Also, according to the present invention, the sensitivities of the user relating to music selection are learned, so that music pieces more closely matching with those sensitivities can be provided to the user, and music selection by the user is made easy.

This application is based on a Japanese Application No. 2003-350728 and No. 2004-095916 which are hereby incorporated by reference.

What is claimed is:

1. A music selecting apparatus for selecting a music piece from a plurality of music pieces in accordance with an input operation, comprising:

a first storage device which stores, as data, a degree of chord change for each of the plurality of music pieces;

a setting device which sets a sensitivity word for music selection from among a plurality of sensitivity words which are previously determined, in accordance with the input operation; and, a music selector which detects a music piece having a degree of chord change corresponding to the sensitivity word set by said setting device, in accordance with the chord change degree for each of the plurality of music pieces, wherein said music selector includes:

a second storage device which stores, as data, a correction value for each of the plurality of sensitivity words;

a reading portion which reads, from said second storage device, the correction value corresponding to the sensitivity word set by said setting device;

a correction device which corrects the chord change degree for each of the plurality of music pieces in accordance with the correction value read by said reading portion to compute a sensitivity matching degree; and an indicating device which indicates the plurality of music pieces in an order corresponding to the sensitivity matching degree computed for each of the plurality of music pieces by said correction device.

2. The music selecting apparatus according to claim 1, wherein said setting device includes an input device which receives a sensitivity word other than the plurality of sensitivity words in accordance with said input operation, and wherein, when the sensitivity word other than the plurality of sensitivity words is received by said input device, said indicating device indicates the plurality of music pieces in random order.

3. The music selecting apparatus according to claim 1, wherein said first storage device stores, as data, the chord change degree for each of the plurality of music pieces, and at least one characteristic parameter indicating a characteristic other than the chord change degree of for each of the plurality of music pieces;

said setting device selects and sets, in accordance with the input operation, the sensitivity word for the music selection from among a plurality of sensitivity words which are previously determined; and, said music selector includes:

a second storage device which stores, as data, a correction value for each of the plurality of sensitivity words, with respect to the chord change degree and the characteristic parameter;

a reading portion which reads, from said second storage device, the correction value with respect to the chord change degree and the characteristic parameter corresponding to the sensitivity word set by said setting device;

a correction device which corrects the chord change degree and the characteristic parameter for each of the plurality of music pieces in accordance with the correction values read by said reading portion, and obtains the sum of the correction results as a sensitivity matching degree; and, an indicating device which indicates the plurality of music pieces, in an order corresponding to the sensitivity matching degree of each of the plurality of music pieces computed by said correction device.

4. The music selecting apparatus according to claim 3, wherein said indicating device includes a third storage device which stores music data indicating a reproduced sound for each of the plurality of music pieces, and an audio output device which reads music data from said third storage device in the order of music pieces corresponding to the sensitivity matching degree of each of the plurality of music pieces, and outputs a reproduced sound based on the read music data.

5. The music selecting apparatus according to claim 1, further comprising:

a matching judgment device which judges, in accordance with an input operation, whether a music piece indicated by said indicating device matches the sensitivity word for the music selection;

a fourth storage device which stores, when the indicated music piece is judged to match the sensitivity word for the music selection by said matching judgment device, the matched music piece in association with the sensitivity word for the music selection;

a matched learning device which computes a correction value corresponding to a sensitivity word for which the number of music pieces stored in said fourth storage device has become equal to or greater than a predetermined number of music pieces, in accordance with the stored values of the chord change degree of the stored music pieces of equal to or greater than the predetermined number;

a fifth storage device which stores the correction value computed by said matched learning device with respect to the chord change degree, in association with each of the plurality of sensitivity words; and, a learning judgment device which judges whether a correction value corresponding to the sensitivity word set by said setting device exists in said fifth storage device; and wherein when said learning judgment device judges that the correction value corresponding to the sensitivity word exist in said fifth storage device, said reading portion reads the correction value corresponding to the sensitivity word from said fifth storage device, instead of from said second storage device.

6. The music selecting apparatus according to claim 5, wherein said reading portion switches the reading of the correction value corresponding to the sensitivity word from said second storage device to said fifth storage device in accordance with an input operation.

7. The music selecting apparatus according to claim 5, further comprising:

a sixth storage device which stores, when said matching judgment device judges that the indicated music piece does not match the sensitivity word for the music selection, the unmatched music piece for each of the plurality of sensitivity words;

an unmatched learning device which computes the correction value corresponding to a sensitivity word for which the number of music pieces stored in said fourth storage device is equal to or greater than a predetermined number, in accordance with the degrees of chord change in unmatched music pieces stored in said sixth storage device; and, a seventh storage device which stores the correction value computed by said unmatched learning device with respect to the chord change degrees, in association with each of the plurality of sensitivity words; and wherein said correction device reads the correction value corresponding to the sensitivity word from said seventh storage device, and corrects the sensitivity matching degree in accordance with the read correction value.

8. The music selecting apparatus according to claim 3, further comprising:

a matching judgment device which judges whether a music piece indicated by said indicating device matches the sensitivity word for the music selection, in accordance with an input operation;

a fourth storage device which stores, when said matching judgment device judges that the indicated music piece matches the sensitivity word for the music selection, the matched music piece, with respect to the degree of chord change and the characteristic parameter, for each of the plurality of sensitivity words;

a matched learning device which computes the correction value for each of the chord change degree and the characteristic parameter corresponding to a sensitivity word for which the number of music pieces stored in said fourth storage device is equal to or greater than a predetermined number, in accordance with the stored values of the chord change degree and the characteristic parameter for the stored music pieces of equal to or greater than the predetermined number;

a fifth storage device which stores the correction value computed by said matched learning device for each of the chord change degree and the characteristic parameters, in association with each of the plurality of sensitivity words; and, a learning judgment device which judges whether correction values corresponding to the sensitivity word set by said setting device exist in said fifth storage device; and wherein when said learning judgment device judges that a correction value corresponding to the sensitivity word exist in said fifth storage device, said reading portion reads the correction value corresponding to the sensitivity word from said fifth storage device instead of from said second storage device.

9. The music selecting apparatus according to claim 1, wherein the chord change degree is at least one of the number of chords per minute in a music piece, the number of types of chords used in the music piece, and the number of change points each of which changes an impression of the music piece such as discord during the chord progression.

10. The music selecting apparatus according to claim 1, wherein the plurality of sensitivity words are "rhythmical", "gentle", "bright", "sad" "healing", and "lonely".

11. The music selecting apparatus according to claim 3, wherein the at least one characteristic parameter is any of a beat, a maximum beat level, an average amplitude level, a maximum amplitude level, and a key, of the music piece.

12. The music selecting apparatus according to claim 1, wherein the correction value includes an average value and an unbiased variance of the chord change degrees.

13. A music selection method for selecting a music piece from among a plurality of music pieces in accordance with an input operation, comprising the steps of:

storing, as data, a degree of chord change for each of the plurality of music pieces;

setting a sensitivity word for music selection in accordance from among a plurality of sensitivity words which are previously determined, *in accordance* with the input operation; and, detecting a music piece having a degree of chord change corresponding to the set sensitivity word, in accordance with the chord change degree for each of the plurality of music pieces, wherein [said music selector] *the music piece detecting step* includes:

[a second storage device which stores, as data, a correction value for each of the plurality of sensitivity words;]

a reading [portion which reads,] *step for reading* from [said second] *a* storage device, [the] *a* correction value corresponding to the sensitivity word set [by said setting device] *in the setting step, the storage device storing, as data, a correction value for each of the plurality of sensitivity words*;

a correction [device which corrects] *step for correcting* the chord change degree for each of the plurality of music pieces in accordance with the correction value read [by said reading portion] *in the reading step* to compute a sensitivity matching degree; and an indicating [device which indicates] *step for indicating* the plurality of music pieces in an order corresponding to the sensitivity matching degree computed for each of the plurality of music pieces [by said correction device] *in the correction step*.

14. A music selecting apparatus for selecting a music piece from among a plurality of music pieces in accordance with an input operation, comprising:

a first storage device which stores, as data, a characteristic value of at least one characteristic parameter for each of the plurality of music pieces;

a setting device which sets a sensitivity word for music selection from among a plurality of sensitivity words, in accordance with the input operation;

a second storage device which stores, as data, a correction value for each of the plurality of sensitivity words;

a reading portion which reads, from said second storage device, the correction value corresponding to the sensitivity word for the music selection set by said setting device;

a correction device which corrects the characteristic value of characteristic parameter for each of the plurality of music pieces in accordance with correction value read by said reading portion to compute a sensitivity matching degree;

a music selector which selects at least one music piece from among the plurality of music pieces, in accordance with the sensitivity matching degree for each of the plurality of music pieces, computed by said correction device;

a matching judgment device which judges whether the at least one music piece selected by said music selector matches the sensitivity word for the music selection, in accordance with an input operation;

a learning value storage device which computes a learning value in accordance with a result of the judgment by said matching judgment device, and stores the computed learning value in association with the sensitivity word for the music selection; and, a learning judgment device which judges, when the sensitivity word for the music selection is set by said setting device, whether the learning value corresponding to the sensitivity word for the music selection exist in said learning value storage device; and wherein when the learning value corresponding to the sensitivity word for the music selection is judged by said learning judgment device to be stored in said learning value storage device, said correction device corrects the characteristic value of characteristic parameter for each of the plurality of music pieces in accordance with the stored learning value to compute the sensitivity matching degree.

15. The music selecting apparatus according to claim 14, wherein said learning value storage device includes:

a fourth storage device which stores, when said matching judgment device judges that the selected music piece matches the sensitivity word for the music selection, the matched music piece in association with the sensitivity word for the music selection;

a matched learning device which computes the learning value for each of the plurality of sensitivity words in accordance with the characteristic value of the characteristic parameter for each of the music pieces stored in said fourth storage device when the number of music pieces stored in said fourth storage device is equal to or greater than a predetermined number;

a fifth storage device which stores the learning value computed by said matched learning device with respect to the characteristic parameter, in association with each of the plurality of sensitivity words;

a sixth storage device which stores, when said matching judgment device judges that the selected music piece does not match the sensitivity word for the music selection, the unmatched music piece in association with the sensitivity word for the music selection;

an unmatched learning device which computes the learning value for each of the plurality of sensitivity words in accordance with the characteristic value of the characteristic parameter for each of the music pieces stored in said fifth storage device when the number of music pieces stored in said fourth storage device is equal to or greater than a predetermined number; and a seventh storage device which stores the learning value computed by said unmatched learning device with respect to the characteristic parameter, in association with each of the plurality of sensitivity words.

16. The music selecting apparatus according to claim 14, wherein said correction device includes a user judgment device, when said learning judgment device judges that the learning value corresponding to the sensitivity word is stored in said learning value storage device, which judges, in accordance with an input operation, whether the learning value stored in said learning value storage device is to be used in music selection, and, when said user judgment device judges that the learning value stored in said learning value storage device is to be used in music selection, said correction device corrects the characteristic value of characteristic parameter for each of the plurality of music pieces in accordance with the stored learning value to compute the sensitivity matching degree.

17. The music selecting apparatus according to claim 15, wherein said correction device reads the learning value corresponding to the sensitivity word for the music selection from said fifth storage device, and reads the learning value corresponding to the sensitivity word for the music selection from said seventh storage device; and, corrects the characteristic value of the characteristic parameter for each of the plurality of music pieces in accordance with the learning value read from said fifth storage device to compute a basic degree of sensitivity matching, and corrects the basic degree in accordance with the learning value read from said seventh storage device to obtain the sensitivity matching degree.

18. The music selecting apparatus according to claim 14, wherein the at least one characteristic parameter is any of a degree of chord change, a beat, a maximum beat level, an average amplitude level, a maximum amplitude level, and a key, of the music piece.

19. A music selection method for selecting a music piece from among a plurality of music pieces in accordance with an input operation, comprising the steps of:

storing a characteristic value of at least one characteristic parameter as data for each of the plurality of music pieces;

setting a sensitivity word for music selection from among a plurality of sensitivity words in accordance with the input operation;

storing a correction value as data for each of the plurality of sensitivity words in a second storage device;

reading the correction value corresponding to the sensitivity word for the music selection from said second storage device;

correcting characteristic value of characteristic parameters for each of the plurality of music pieces in accordance with the read correction value to compute a sensitivity matching degree;

selecting at least one music from among the plurality of music pieces in accordance with the sensitivity matching degrees computed for each of the plurality of music pieces;

judging whether the selected music piece matches the sensitivity word for the music selection, in accordance with the input operation;

computing a learning value in accordance with the judgment result, and storing the computed learning value in a learning value storage device in association with the sensitivity word for the music selection;

judging whether the learning value corresponding to the sensitivity word for the music selection exists in said learning value storage device at the time the sensitivity word for the music selection is set; and, when it is judged that the learning value corresponding to the sensitivity word for the music selection is stored in said learning value storage device, correcting the characteristic value of characteristic parameter for each of the plurality of music pieces in accordance with the stored learning value to compute the sensitivity matching degree.

* * * * *